United States Patent [19]

Brand

[11] 3,781,489

[45] Dec. 25, 1973

[54] METHOD AND APPARATUS FOR ALIGNING MAGNETIC HEADS IN A MAGNETIC DISC RECORDER

[75] Inventor: Abraham Brand, Encino, Calif.

[73] Assignee: General Instrument Corporation, Hawthorne, Calif.

[22] Filed: Aug. 2, 1972

[21] Appl. No.: 277,327

[52] U.S. Cl. 179/100.2 R, 179/100.2 CA, 274/4 H, 340/174.1 C

[51] Int. Cl. .............................................. G11b 5/56

[58] Field of Search ........... 179/100.2 R, 100.2 CA; 340/174.1 C; 274/4 H

*Primary Examiner*—Terrell W. Fears
*Assistant Examiner*—Robert S. Tupper
*Attorney*—Ellsworth R. Roston et al.

[57] ABSTRACT

A method and apparatus for accurately aligning a plurality of magnetic heads in a magnetic disc recorder and reproducer, including the use of a transparent disc member having radial lines arranged around a central opening of the disc member, and having lines perpendicular to the radial lines also arranged around the central opening, and with the combination of the radial lines and the lines perpendicular to the radial lines forming locations for the alignment of the magnetic heads, and with the magnetic heads divided into groups supported in comb members accurately located to properly position the magnetic heads in a group relative to each other and to provide the air gaps of such group of magnetic heads to be along a straight line and with each comb member supported by a mounting means and with the transparent disc member including openings located adjacent to the radial lines to provide access to the mounting means to provide for the proper alignment of the groups of magnetic heads.

17 Claims, 6 Drawing Figures

METHOD AND APPARATUS FOR ALIGNING MAGNETIC HEADS IN A MAGNETIC DISC RECORDER

The present invention is directed to a method and apparatus for accurately aligning a plurality of magnetic heads in a magnetic disc recording and reproducing system. Conventional magnetic disc recording and reproducing systems are usually of two types. A first type provides for a movable head assembly to record and to reproduce information on a magnetic disc. Such a system is advantageous in that it allows for the interchangeability of magnetic discs between different magnetic disc recording and reproducing systems. However, such a system is basically a slow access memory system and since it is desirable to provide for a fast access memory system, a second type of magnetic disc recording and reproducing system is used in place of the first type.

The second type of magnetic disc recording and reproducing system uses a plurality of magnetic heads arranged radially around a central spindle and with the heads being fixed in position so as to provide for a fast access to individual tracks on the magnetic disc for recording and reproducing information in these individual tracks. The heads, for example, may be arranged in groups for convenience in mounting the heads and with each head in each group providing access to a single individual track on the magnetic disc. Such a magnetic disc recording and reproducing system is a relatively fast access memory system, but suffers from the disadvantage in that information recorded on a magnetic disc on one machine must be replayed on that same machine. In fact, most such magnetic disc machines provide for a single magnetic disc which is locked in position and may be considered to be a permanent part of the machine.

It would therefore be desirable to provide for a magnetic disc recording and reproducing system which is relatively high speed in operation but yet provides for interchangeability of magnetic discs between different machines. In order to provide for such interchangeability it is imperative that the magnetic heads be extremely accurately positioned so that information recorded on one machine will be able to be replayed with accuracy on a different machine. Such precision in the alignment of the magnetic heads in magnetic disc recording and reproducing machines has heretofore been difficult to achieve without great skill and considerable time being expended by very skilled personnel.

The present invention is directed to a method and apparatus for accurately aligning a plurality of magnetic heads in a magnetic disc recording and reproducing machine wherein such alignment may be accomplished with relatively low skill employees and with such alignment being accomplished in a relatively short period of time. The magnetic heads are usually arranged in groups as indicated above, and the method and apparatus for alignment is usually accomplished in the following fashion.

Each group of magnetic heads is supported in a comb member. The comb member includes a plurality of slots which are accurately machined as to their depth so that when the individual magnetic heads are inserted one to a slot, the air gaps of the magnetic heads in the group are aligned in a straight line. In addition, the individual heads are positioned in the comb using a very accurate assembly tool so that the spacing between each magnetic head is again accurately aligned so that the distance between the magnetic heads is accurate. The comb members supporting the groups of magnetic heads are provided with a mounting means which is adjustable so that the groups of magnetic heads may be accurately positioned in relation to each other so as to provide for the accurate recording and reproduction of information on the magnetic disc.

The positioning of the groups of magnetic heads is accomplished in the following manner. The present invention includes the use of a disc member such as a transparent disc member which includes a plurality of radial lines arranged radially around a central opening of the disc member. Specifically, the radial lines may be formed in sets of at least two radial lines, closely spaced, with the spacing between the two lines equal to the maximum allowable error which is permissible in the system and still provide for interchangeability of the magnetic discs between different machines. The transparent disc member also includes lines perpendicular to the radial lines so that the combination of the radial lines and the lines perpendicular to the radial lines provide for locations for aligning the groups of magnetic heads. The groups of magnetic heads supported in the comb members and the comb members are roughly mounted in different radial positions around a central spindle.

In addition to the radial lines and the line perpendicular to the radial lines when the disc member includes a plurality of openings located adjacent to the radial lines so that when the disc is mounted on the center spindle of the magnetic disc recorder and reproducer, the openings through the disc provide access to the mounting means which mount the groups of magnetic heads. The disc member may be positioned at a predetermined location, for example, through the use of an opening to provide for a locking member to pass through the disc member and into a corresponding opening in the magnetic disc recorder and reproducer and with the disc then locked in the desired location.

The groups of magnetic heads may be aligned accurately using the locations provided by the radial lines and the lines perpendicular to the radial lines. Specifically, a portion, such as an edge portion of the outermost head in each comb member may be aligned with the lines perpendicular to the radial lines and the air gaps of the groups of magnetic heads may be positioned within the sets of at least two radial lines closely spaced apart. Therefore, the groups of magnetic heads are accurately aligned both as to relative position radially around the center spindle and also, as to the distance away from the center spindle to accurately provide for the recording and playback of information on magnetic discs, and specifically to provide for the accurate recording and playback of magnetic discs which are interchangeable between different machines.

It may therefore be seen that the present invention provides for an improved method and apparatus for providing for the precise alignment of a plurality of magnetic heads used in a fast access magnetic disc record and reproducing system of the type where individual heads are provided for each recording track. This accurate alignment is initially provided by the precise location of individual magnetic heads in the comb member and with a simple method providing using the transparent disc aligning tool so as to allow for the accurate positioning of each group of magnetic heads relative to each other and relative to the center spindle of the magnetic disc record and reproducing system.

A clearer understanding of the invention will be had with reference to the following description and drawings wherein.

Figure 1:
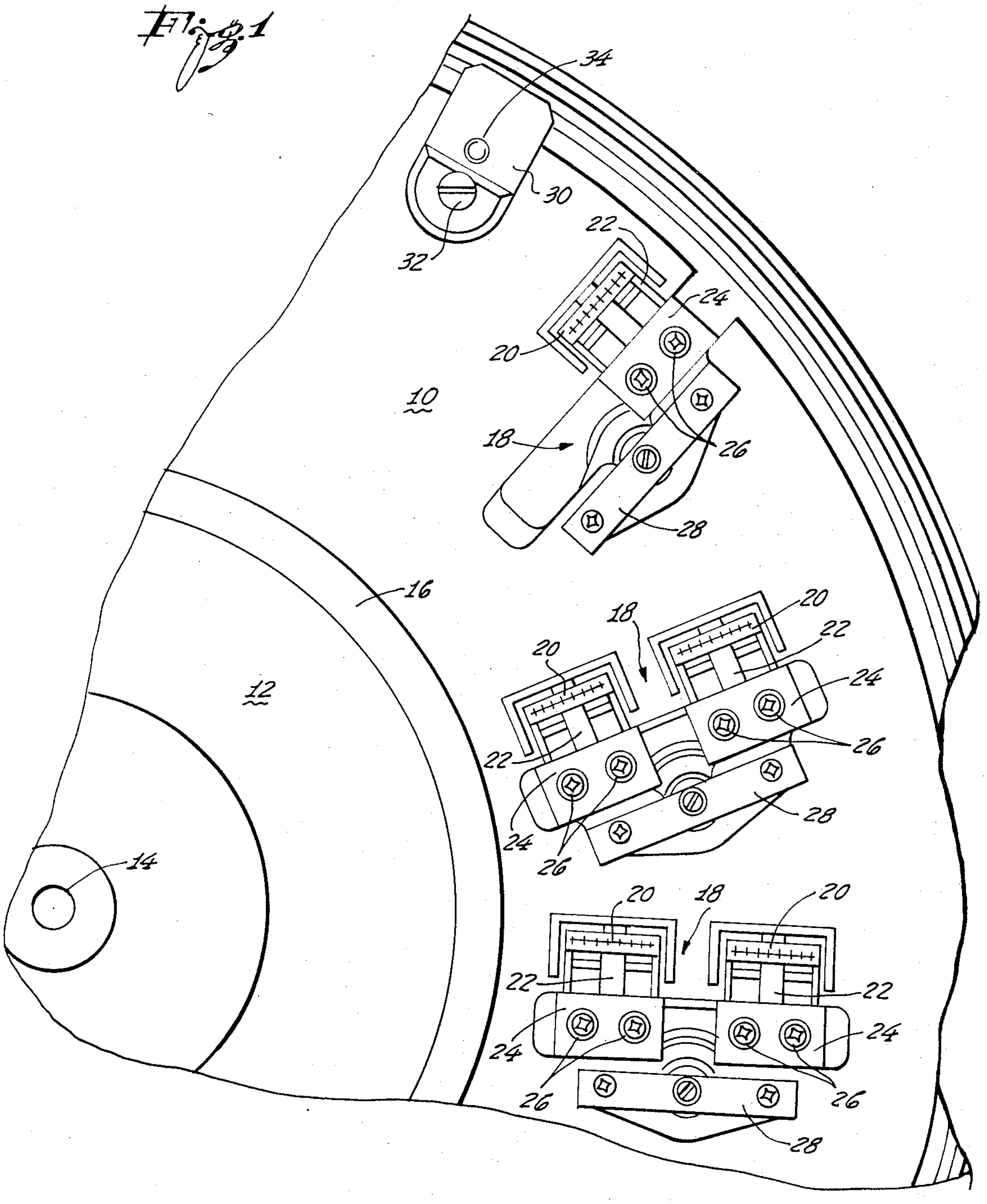
FIG. 1 illustrates a portion of a top plate of a magnetic disc recorder and reproducer illustrating the position of a number of magnetic assemblies.
Figure 2:
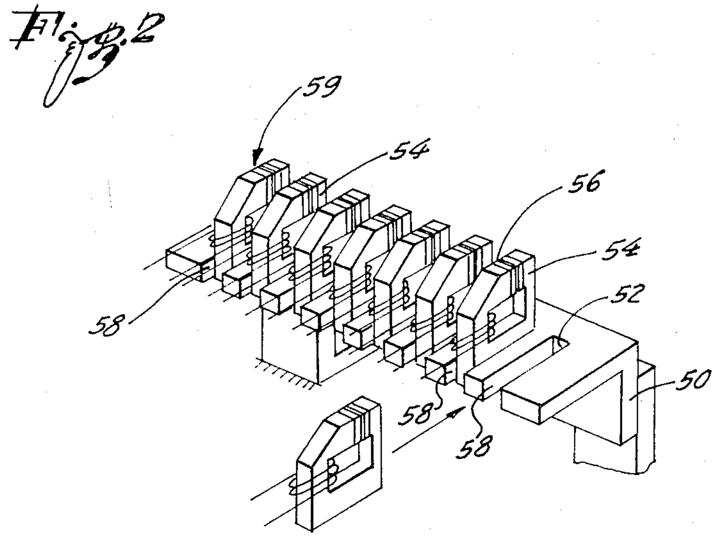
FIG. 2 illustrates a perspective view of a group of magnetic heads positioned in a comb member for mounting on the top plate of FIG. 1.
Figure 3:
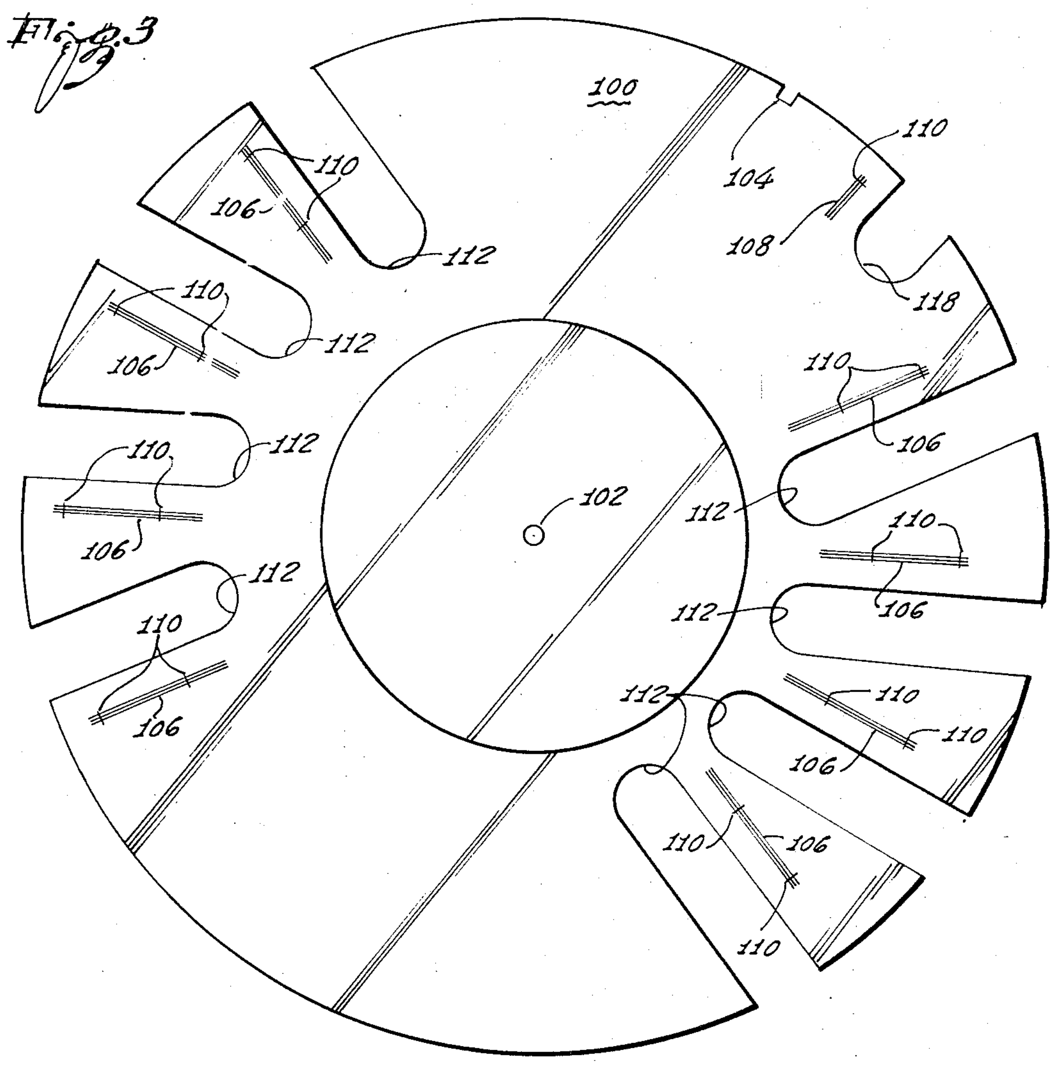
FIG. 3 illustrates an alignment tool formed as a transparent disc member for use with the magnetic disc recorder and reproducer of FIG. 1.
Figure 5:
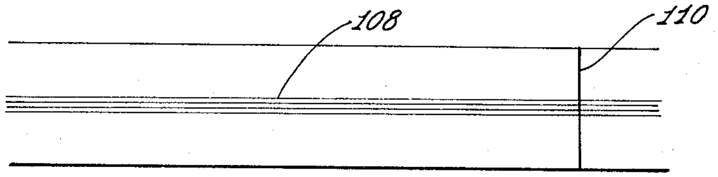
Figure 6:
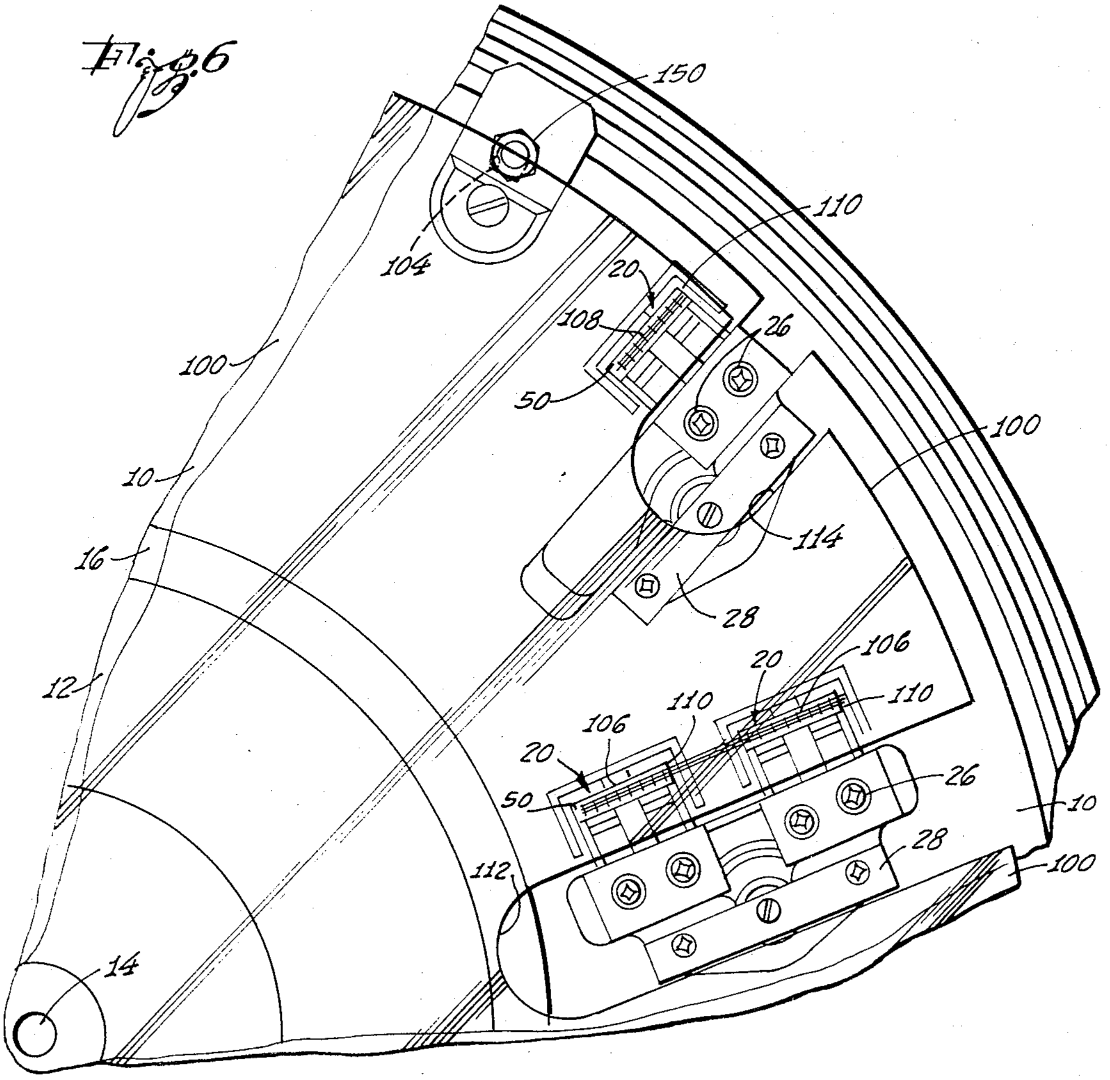

FIG. 5 illustrates a second set of lines included in the disc member of FIG. 3 for use in aligning the other groups of magnetic heads in the system of FIG. 1; and FIG. 6 illustrates a fragmentary portion of the top plate of the magnetic disc recorder-reproducer of FIG. 1 and showing the complementary portion of the disc member of FIG. 3 in position so as to provide for the alignment of the groups of magnetic heads shown in FIG. 2.

In FIG. 1 a portion of the top plate 10 of the magnetic disc recorder and reproducer is shown. A rotating section 12 including a center spindle 14 and a rim member 16 provide for a rotation of such rotating section 12 relative to the top plate 10. In normal practice a magnetic disc member (not shown) is positioned on the rotating section 12 and is supported by the center spindle 14 and the rim 16 so that the disc member may be rotated at relatively high speed above the top plate 10. A plurality of head assemblies 18 are positioned on the top plate 10 which head assemblies support groups of magnetic heads 20 in a position to provide for the recording and reproduction of the magnetic disc member (not shown) which would be positioned above the groups of magnetic heads 20.

The groups of magnetic heads 20 are supported by a resilient support assembly 22 and the combination of the groups of magnetic heads 20 and the support assembly 22 are maintained in position by mounting means 24. The mounting means 24 may be adjustable in position and with screws 26 used to lock the mounting means in the desired position to provide for the proper position of the groups of magnetic heads 20. A solenoid assembly 28 may be included so as to provide for the raising or lowering of the groups of magnetic heads 20 into engagement with the magnetic disc.

The top plate 10 of the magnetic disc recorder-reproducer of FIG. 1, also includes a locking plate 30 secured to the top plate 10 using a bolt 32. The locking plate includes a locking opening 34 which is used in combination with the alignment disc of FIG. 3 in a manner to be explained.

In FIG. 2 detail is shown of a group of magnetic heads positioned in a head comb 50. The head comb 50 includes slots 52 which are accurately machined as to their depth so that individual magnetic heads 54 when positioned within the slots 52 have their air gaps 56 arranged along a straight line. In order to insure that the distance between the magnetic heads 54 are accurately aligned relative to each other, the individual heads are assembled into the comb using a precise tool so that the distance between adjacent sides 58 is also accurately maintained. This insures that the distance between the tracks on the magnetic disc is also accurately maintained.

In the method of constructing the magnetic disc recorder-reproducer the magnetic heads 54 are carefully inserted into the slots 52 to the full depth of the slots 52 and with the heads positioned using the positioning tool. This insures that the air gaps 56 are all aligned along a straight line and that the distance between adjacent magnetic heads is proper so as to insure for the proper recording and reproduction of information on magnetic discs, which discs may be interchanged between magnetic disc machines. The individual core members 54 may be epoxied in position using a fixture to maintain the proper positioning of the magnetic heads as explained above.

The groups of magnetic heads are now accurately arranged in the comb members 50 and the comb members may now be mounted in the support structures 22 which is attached to the mounting means 24. The mounting means 24 may be then attached to the top plate 10 but with a final adjustment of the position of the mounting means and the groups of magnetic heads occurring through the use of the alignment tool, such as the transparent disc, shown in FIG. 3.

The disc member 100 of FIG. 3 may be made of a stable transparent material. For example, the disc member may be made of glass or a rigid plastic material. The disc member 100 includes a center opening 102 which is used to position the disc member on the center spindle 14 of the magnetic disc recorder-reproducer of FIG. 1.

The transparent disc member 100 includes a locking opening 104 which is used in association with the locking opening 34 of the locking plate 30 shown in FIG. 1. Once the disc member 100 has been positioned on the center spindle 14, the disc member may be locked in position by passing a bolt through the locking opening 104 into the locking opening 34. This can be seen in more detail with reference to FIG. 6.

Returning now to FIG. 3, the transparent disc 100 also includes a plurality of radial lines 106 which are positioned radially around the disc member to correspond to the groups of magnetic heads which are positioned radially around the center spindle 14, as shown in FIG. 1. In addition, a single set of radial lines 108 which is shorter than the set of radial lines 106 is used specifically for the positioning of the clockhead which is included in the uppermost group of magnetic heads 20 shown in FIG. 1. In addition to the radial lines 106 and 108, lines 110 which are perpendicular to the radial lines 106 and 108, are also used for properly aligning the position of the magnetic heads. Specifically, the combinations of the radial lines 106 and 108 and the lines 110 perpendicular to the radial lines from locations for the groups of magnetic heads. The lines 106, 108, and 110 may be placed on the disc member 100 by depositing material on the disc member 100 or the lines may be placed on the disc member 100 by inscribing or etching the disc member 100.

Figure 4:
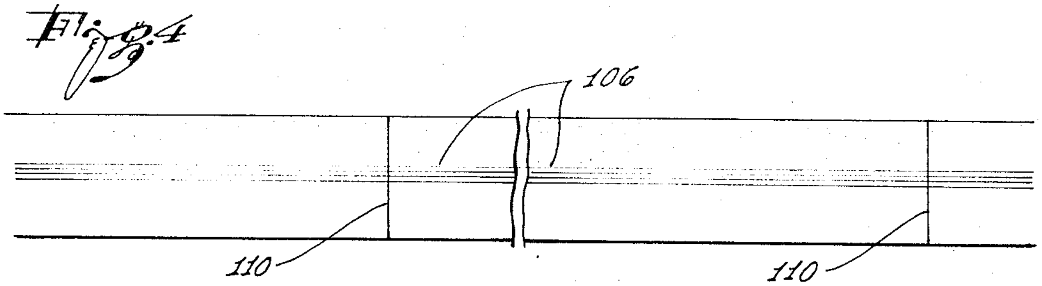
FIG. 4 illustrates in detail a first set of lines included in the disc member of FIG. 3, and specifically for use in aligning a clockhead.

The lines on the disc member 100 may be seen in more detail in FIGS. 4 and 5; specifically, FIG. 4 illustrates the lines 108 which are used to align the clockhead and FIG. 5 illustrates the lines 106 which are used for all the other groups of magnetic heads. In addition, lines 110 perpendicular to the lines 108 and 106 are shown in both FIGS. 4 and 5. As can be seen in FIGS. 4 and 5, the sets of lines 106 and 108 actually include four radial lines closely spaced and specifically the inner two of each group of four radial lines is used to provide for the alignment of the groups of magnetic heads in a manner to be explained. The actual distance between the inner two of the groups of lines 106 and 108 is equal to the maximum allowable error allowed in the alignment between the groups of magnetic heads. For example, the distance between the inner two of the radial lines in the sets of lines 106 and 108 may have a value such as 0.002 inch so as to determine the maximum allowable error. It is to be appreciated that the lines in each set of lines 106 and 108 are parallel to each other. Therefore, the lines are not truly radial but are offset slightly from the radial position. The term "radial" as used in this application is, however, meant to include the lines 106 and 108.

Returning to FIG. 3, the transparent disc 100 includes openings 112 which are positioned adjacent to the groups of radial lines 106 and an opening 114 which is positioned adjacent to the group of radial lines 108. The openings 112 and 114 are used to provide access to the mounting means 24 of FIG. 1 so that the specific position of the groups of magnetic heads 20 may be accurately aligned. This may be seen in more detail in FIG. 6.

In FIG. 6 a fragmentary view of a portion of the transparent disc 100 positioned over a portion of the top plate 10 is shown. As indicated previously, the transparent disc 100 is locked in position by passing a bolt member 150 through the locking opening 104 in the disc member 100 into the locking opening 34, as shown in FIG. 1. This locking securely positions the transparent disc member in a fixed position.

After the disc member 100 is locked in position, it can be seen that the radial lines 108 and line 110 perpendicular to the radial lines 108, are positioned over the uppermost one of the group of magnetic heads 20. In order to align this first group of magnetic heads 20, the air gaps 56, shown in FIG. 2 to lie along a straight line, are positioned to lie within the innermost top of the group of radial lines 108 shown in FIG. 4. In this way, all of the air gaps are arranged between the innermost two of the group of radial lines 108 with a high accuracy to provide for the proper radial position of the first group of magnetic heads 20 around the perimeter of the top plate 10. In order to provide for the proper position of this first group of magnetic heads 20 in relation to the center spindle, an edge portion of the first group of magnetic heads such as the edge of the outermost magnetic head 59 is positioned to lie below the line 110 perpendicular to the group of radial lines 108. This provides for an accurate positioning of the tracks relative to the center spindle 14 shown in FIG. 1.

Once the first group of magnetic heads 20 shown in the uppermost position in FIG. 1 is aligned, then all of the other groups of magnetic heads 20 formed in pairs which extend radially around the top plate member 10 are positioned in a similar manner. That is, the air gaps arranged along straight lines are positioned within the innermost two of the groups of radial lines 106 and an edge of each of the outermost magnetic head 59 is positioned beneath the line 110 perpendicular to the radial lines 106. In order to provide for the accurate positioning of the magnetic heads relative to the lines 106 and 108 and the lines 110, a microscope of approximately 20–30 power may be used to view the air gaps relative to these lines. Once the magnetic heads are accurately aligned, then the screw members 26 may be tightened down to provide for this alignment to be maintained. Access to the screw member 26 is provided through the openings 114 and 112 which extend through the transparent disc member.

Another advantage of the alignment system with the present invention is that the alignment is carried out with the magnetic head in an operative position. This is because the transparent disc member 100 actually takes the place of the magnetic disc so that the alignment technique described above simulates actual operative conditions. The head members may be placed in a position in contact with the transparent disc using the solenoid members 28.

It can be seen therefore that the present invention relates to a method and apparatus for accurately aligning groups of magnetic heads in a magnetic disc recorder-reproducer system so as to provide for interchangeability of discs between different magnetic disc recorder-reproducers of the type including multiple heads and tracks. This precise mechanical alignment is necessary so that a disc recorded on one machine can be replayed on a second machine or can be partially rerecorded on the second machine. The invention uses the accurate alignment of the individual heads in a comb member and with the use of a transparent disc including radial lines and lines perpendicular to the radial lines to provide for an alignment of the relative position of the groups of magnetic heads. Any slight errors which may remain after the above alignment may be compensated for using standard electronic techniques including the use of guard bits at the beginning and end of each word of recorded information. Although the invention has been described with reference to a particular embodiment, it is to be appreciated the invention is only to be limited by the claims.

I claim:

1. A method of aligning a plurality of magnetic heads in a magnetic disc recorder-reproducer to accurately read and write information in a plurality of tracks on magnetic discs so that the magnetic discs may be interchangeable and with the magnetic heads formed in groups arranged in radial positions around a center spindle of the magnetic disc recorder and reproducer and with the method of aligning using a transparent disc member having a plurality of radial lines arranged around a center opening of the transparent disc member and having a plurality of lines perpendicular to the radial lines and with the combination of the radial lines and the lines perpendicular to the radial lines forming locations for the groups of magnetic heads and with the method of aligning including the following steps, placing the center opening of the transparent disc member over the center spindle to position the transparent disc member in a plane parallel to the plurality of magnetic heads, locking the transparent disc member in a predetermined location to position the lines on the disc relative to the plurality of magnetic heads so that each group of magnetic heads is adjacent to a set of lines including at least one radial line and one line perpendicular to the radial line, and aligning each group of magnetic heads in relation to a set of lines to align the plurality of magnetic heads in relation to each other.

2. method of claim 1 wherein each set of lines includes two radial lines spaced apart by a distance equal to the maximum alignment error allowable in the magnetic disc recorder and reproducer and with the step of aligning including positioning of the air gaps of each group of magnetic heads between the two radial lines.

3. The method of claim 1 wherein each group of magnetic heads is supported in a comb member and with the step of aligning including positioning an edge portion of the outermost magnetic head in a comb member to be in alignment with the line perpendicular to the radial line.

4. The method of claim 1 wherein the transparent disc includes a locking opening extending therethrough and the magnetic disc recorder and reproducer includes a corresponding locking opening and with the step of locking including the use of a locking means passing into the two locking openings.

5. A method of aligning a plurality of magnetic heads at radial positions around a central position, including the following steps locating the plurality of magnetic heads of individual radial positions and with such location providing a rough adjustment of the relative position of the magnetic heads at the radial positions, providing a transparent disc member having a plurality of radial lines located around a central position and having lines perpendicular to the radial lines and with the combination of radial lines and lines perpendicular to the radial lines providing a fine adjustment of the relative positions of the magnetic heads at the radial positions, placing the transparent disc member adjacent the plurality of magnetic heads so that the central position of the transparent disc and the plurality of magnetic heads is located along a common axis and so that the combinations of radial line and lines perpendicular to the radial lines are adjacent to the plurality of magnetic heads, and aligning the plurality of magnetic heads in relation to the combinations of radial lines and lines perpendicular to the radial lines to provide a fine adjustment of the relative positions of the magnetic heads at the radial positions.

6. The method of claim 5 wherein the radial lines are formed in closely spaced groups of at least two radial lines and with such spacing equal to the maximum allowable alignment error for the plurality of magnetic heads and with the step of aligning including the positioning of a portion of individual ones of the magnetic heads between the two radial lines of a group.

7. The method of claim 5 wherein the plurality of magnetic heads is divided into groups with each group supported in a comb member and with the step of aligning including positioning an edge portion of each of the outermost magnetic heads in a comb member to be in alignment with an individual one of the lines perpendicular to the radial lines.

8. The method of claim 5 wherein the transparent disc includes a locking opening and with an additional step of locking the transparent disc in position adjacent the plurality of magnetic heads using a locking member passing through the locking opening.

9. An alignment tool for use in aligning a plurality of magnetic heads in a magnetic disc recorder and reproducer wherein the magnetic heads are formed in groups arranged in radial positions around a center spindle of the magnetic disc recorder and reproducer, and with the alignment tool including a transparent disc member having a central opening for positioning the disc member on the center spindle of the magnetic disc recorder and reproducer, a plurality of radial lines arranged around the central opening of the transparent disc member, a plurality of lines perpendicular to the radial lines and with the lines perpendicular to the radial lines also arranged around the central opening of the transparent disc member, and the combination of the plurality of radial lines and the plurality of lines perpendicular to the radial lines forming locations for the positioning of the groups of magnetic heads for providing an alignment of the relative position of the groups of magnetic heads.

10. The alignment tool of claim 9 wherein the radial lines are formed in groups of at least two radial lines spaced apart by a distance equal to the maximum allowable alignment error for the groups of magnetic heads.

11. The alignment tool of claim 9 wherein the magnetic disc recorder and reproducer includes an opening used for locking the transparent disc and additionally including a locking opening in the transparent disc for providing a locking of the transparent disc member by a locking member passing into the locking openings of the transparent disc and the magnetic disc recorder and reproducer.

12. The alignment tool of claim 9 wherein the groups of magnetic heads are supported by mounting means and the transparent disc member includes a plurality of openings located radially around the central opening and positioned adjacent to the radial lines for providing access to the mounting means for the groups of magnetic heads for alignment of the magnetic heads.

13. A magnetic disc recording and reproducing system including an alignment tool including a plurality of magnetic heads formed in groups and arranged in radial positions around a central spindle, and a disc member having a central opening and with the central opening of the disc member positioned on the center spindle and with the disc member having a plurality of radial lines arranged around the central opening and a plurality of lines perpendicular to the radial lines also arranged around the central opening and with the combination of radial lines and lines perpendicular to the radial lines forming locations for positioning the groups of magnetic heads to align the groups of magnetic heads relative to each other.

14. The system of claim 13 additionally including comb members each having a plurality of slots for receiving one group of magnetic heads and with each slot receiving a magnetic head and with the depth of each slot accurately machined to provide an alignment of the air gaps of the group of magnetic heads and with the individual magnetic heads located accurately in an assembly tool to accurately position the magnetic heads in relation to each other.

15. The system of claim 13 wherein the radial lines are formed in groups of at least two radial lines spaced apart by a distance equal to the maximum allowable alignment error for the groups of magnetic heads.

16. The system of claim 13 wherein the magnetic disc recorder and reproducer includes an opening used for locking the disc member and additionally including a locking opening in the disc member for providing a locking of the disc member by a locking member passing into the locking openings of the disc member and the magnetic disc recorder and reproducer.

17. The system of claim 13 wherein the groups of magnetic heads are supported by mounting means and the disc member includes a plurality of openings located radially around the central opening and positioned adjacent to the radial lines for providing access to the mounting means for the groups of magnetic heads for alignment of the magnetic heads.

* * * * *